United States Patent
Carette et al.

(10) Patent No.: US 12,500,873 B2
(45) Date of Patent: Dec. 16, 2025

(54) APPARATUS AND METHOD FOR PRIVACY PRESERVATION, DEVICE, COMPUTING SYSTEM AND METHOD FOR A COMPUTING SYSTEM

(71) Applicant: Sony Group Corporation, Tokyo (JP)

(72) Inventors: Thomas Carette, Stuttgart (DE); Alexandru Serbanati, Stuttgart (DE); Michelle Minelli, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 115 days.

(21) Appl. No.: 18/275,615

(22) PCT Filed: Feb. 2, 2022

(86) PCT No.: PCT/EP2022/052396
§ 371 (c)(1),
(2) Date: Aug. 3, 2023

(87) PCT Pub. No.: WO2022/207158
PCT Pub. Date: Oct. 6, 2022

(65) Prior Publication Data
US 2024/0106810 A1    Mar. 28, 2024

(30) Foreign Application Priority Data

Mar. 29, 2021 (EP) .................................. 21165436

(51) Int. Cl.
H04L 29/06    (2006.01)
H04L 9/40    (2022.01)

(52) U.S. Cl.
CPC ...... *H04L 63/0457* (2013.01); *H04L 63/0421* (2013.01)

(58) Field of Classification Search
None
See application file for complete search history.

(56) References Cited

U.S. PATENT DOCUMENTS 8,619,194 B1 * 12/2013 Franji ............. H04N 21/25816
348/715
8,627,107 B1 * 1/2014 Kennedy ................. G06F 21/62
713/150

(Continued)

FOREIGN PATENT DOCUMENTS

| CN | 110213036 A | 9/2019 |
| EP | 2485430 A2 | 8/2012 |
| WO | 2020/183453 A1 | 9/2020 |

OTHER PUBLICATIONS

International Search Report and Written Opinion mailed on May 27, 2022, received for PCT Application PCT/EP2022/052396, filed on Feb. 2, 2022, 9 pages.

(Continued)

*Primary Examiner* — Maung T Lwin
(74) *Attorney, Agent, or Firm* — XSENSUS LLP

(57) ABSTRACT

An apparatus including interface circuitry configured to read, from a sensor, event data indicating an event detected by the sensor and identification data indicating a first identifier (ID) of a user involved in the event. The first interface circuitry is further configured to generate a data stream comprising at least the event data and the identification data. Additionally, the apparatus includes processing circuitry configured to generate an updated data stream based on the data stream by updating the first ID to a second ID using a deterministic update function, and by adding noise to at least the event data. The processing circuitry is further configured to determine whether sufficient privacy budget is left for the updated data stream, and, if so, generate encrypted data by encrypting the updated data stream. The apparatus includes second interface circuitry configured to output the encrypted data for transmission to an external data aggregator.

19 Claims, 6 Drawing Sheets

(56) References Cited

U.S. PATENT DOCUMENTS

| | | | |
|---|---|---|---|
| 10,146,958 B2* | 12/2018 | Wang | H04L 9/00 |
| 10,789,363 B1* | 9/2020 | Gursoy | G06F 21/6254 |
| 2012/0204026 A1* | 8/2012 | Shi | H04L 9/3006 |
| | | | 713/168 |
| 2015/0371059 A1* | 12/2015 | Bilogrevic | H04L 9/085 |
| | | | 726/26 |
| 2016/0063278 A1* | 3/2016 | Kraska | G06F 21/602 |
| | | | 713/165 |
| 2019/0013950 A1 | 1/2019 | Becker et al. | |
| 2019/0109874 A1 | 4/2019 | Samuel et al. | |
| 2020/0327252 A1* | 10/2020 | Mcfall | G06F 21/78 |
| 2020/0349288 A1 | 11/2020 | Jun et al. | |

OTHER PUBLICATIONS

Kim et al., "Privacy-preserving aggregation of personal health data streams", PLOS One, vol. 13, No. 11, Nov. 29, 2018, pp. 1-15.

Maycock et al., "Hardware Enforced Statistical Privacy", IEEE Computer Architecture Letters, 2015, pp. 1-4.

Huo et al., "Re-ADP: Real-Time Data Aggregation with Adaptive w-Event Differential Privacy for Fog Computing", Wireless Communications and Mobile Computing, vol. 2018, Jul. 8, 2018, pp. 1-13.

Chamikara et al., "Local Differential Privacy for Deep Learning", IEEE Internet of Things Journal, arXiv:1908.02997v3 [cs.LG], Available Online at: https://arxiv.org/pdf/1908.02997.pdf, Nov. 9, 2019, pp. 1-16.

Nguyen et al., "DuetSGX: Differential Privacy with Secure Hardware", arXIV:2010.10664v1, Oct. 20, 2020, pp. 1-5.

* cited by examiner

APPARATUS AND METHOD FOR PRIVACY PRESERVATION, DEVICE, COMPUTING SYSTEM AND METHOD FOR A COMPUTING SYSTEM

CROSS-REFERENCE TO RELATED APPLICATIONS

The present application is based on PCT filing PCT/EP2022/052396, filed Feb. 2, 2022, which claims priority from European Patent Application Number EP 21165436.3, filed Mar. 29, 2021, the contents of each are hereby incorporated by reference.

FIELD

The present disclosure relates to privacy preserving collection of data. In particular, examples relate to an apparatus and a method for privacy preservation, a device comprising the apparatus, a computing system and a method for a computing system.

BACKGROUND

Many distributed systems provide a shared software environment for user applications on a peripheral device. For example, applications can run in separated environments (sandboxes) on a smartphone. This trend will likely extend to future Internet of Things (IoT) devices.

A provider may deploy many connected IoT devices in the field. An individual may cause data traces across multiple IoT devices. When collecting the data, the privacy of a data subject (e.g. in the case of untrusted applications) across multiple sensing devices should be protected. Further, the cost of securing data for trusted applications should be reduced.

Hence, there may be a demand for a privacy preserving data collection.

SUMMARY

This demand is met by apparatuses and methods in accordance with the independent claims. Advantageous embodiments are addressed by the dependent claims.

According to a first aspect, the present disclosure provides an apparatus for privacy preservation. The apparatus comprises first interface circuitry configured to read, from a sensor, event data indicating an event detected by the sensor and identification data indicating a first identifier (ID). The first ID identifies a user involved in the event. The first interface is further configured to generate a data stream comprising at least the event data and the identification data. Additionally, the apparatus comprises processing circuitry configured to generate an updated data stream based on the data stream by updating the first ID to a second ID in the identification data using a deterministic update function, and by adding noise to at least the event data. The processing circuitry is further configured to determine whether sufficient privacy budget is left for the updated data stream. If it is determined that sufficient privacy budget is left for the updated data stream, the processing circuitry is configured to generate encrypted data by encrypting the updated data stream. The apparatus comprises second interface circuitry configured to output the encrypted data for transmission to an external data aggregator.

According to a second aspect, the present disclosure provides a device comprising an apparatus for privacy preservation according to the present disclosure. Further, the device comprises a sensor configured to generate the event data and the identification data upon detection of the event. The device additionally comprises a transmitter coupled to the second interface circuitry and configured to transmit the encrypted data to the data aggregator via a communication network.

According to a third aspect, the present disclosure provides a computing system comprising first interface circuitry, second interface circuitry, third interface circuitry and processing circuitry. The processing circuitry is configured to control the computing system to act as data aggregator for a plurality of devices by: controlling the first interface circuitry to receive a plurality of pieces of encrypted data from the plurality of devices, wherein each piece of encrypted data comprises at least event data indicating an event detected by a sensor of the respective device and identification data indicating an Identifier, ID, for a user involved in the event; controlling the second interface circuitry to receive, from an external orchestrator orchestrating the data aggregator and the plurality of devices, cryptographic data; decrypting the plurality of pieces of encrypted data using the cryptographic data in order to generate a plurality of pieces of decrypted data; storing the plurality of pieces of decrypted data in a data storage; grouping pieces of decrypted data in the data storage comprising identification data that indicate the same ID in order to generate a respective group for each ID; determining whether sufficient privacy budget is left for the ID of the respective group; and controlling the third interface circuitry to output the event data of the respective group if it is determined that sufficient privacy budget is left for the ID of the respective group.

According to a fourth aspect, the present disclosure provides a method for privacy preservation. The method comprises reading, from a sensor, event data indicating an event detected by the sensor and identification data indicating a first ID. The first ID identifies a user involved in the event. Further, the method comprises generating a data stream comprising at least the event data and the identification data. The method additionally comprises generating an updated data stream based on the data stream by updating the first ID to a second ID in the identification data using a deterministic update function, and by adding noise to at least the event data. Further, the method comprises determining whether sufficient privacy budget is left for the updated data stream. If it is determined that sufficient privacy budget is left for the updated data stream, the method comprises generating encrypted data by encrypting the updated data stream. In addition, the method comprises outputting the encrypted data for transmission to an external data aggregator.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
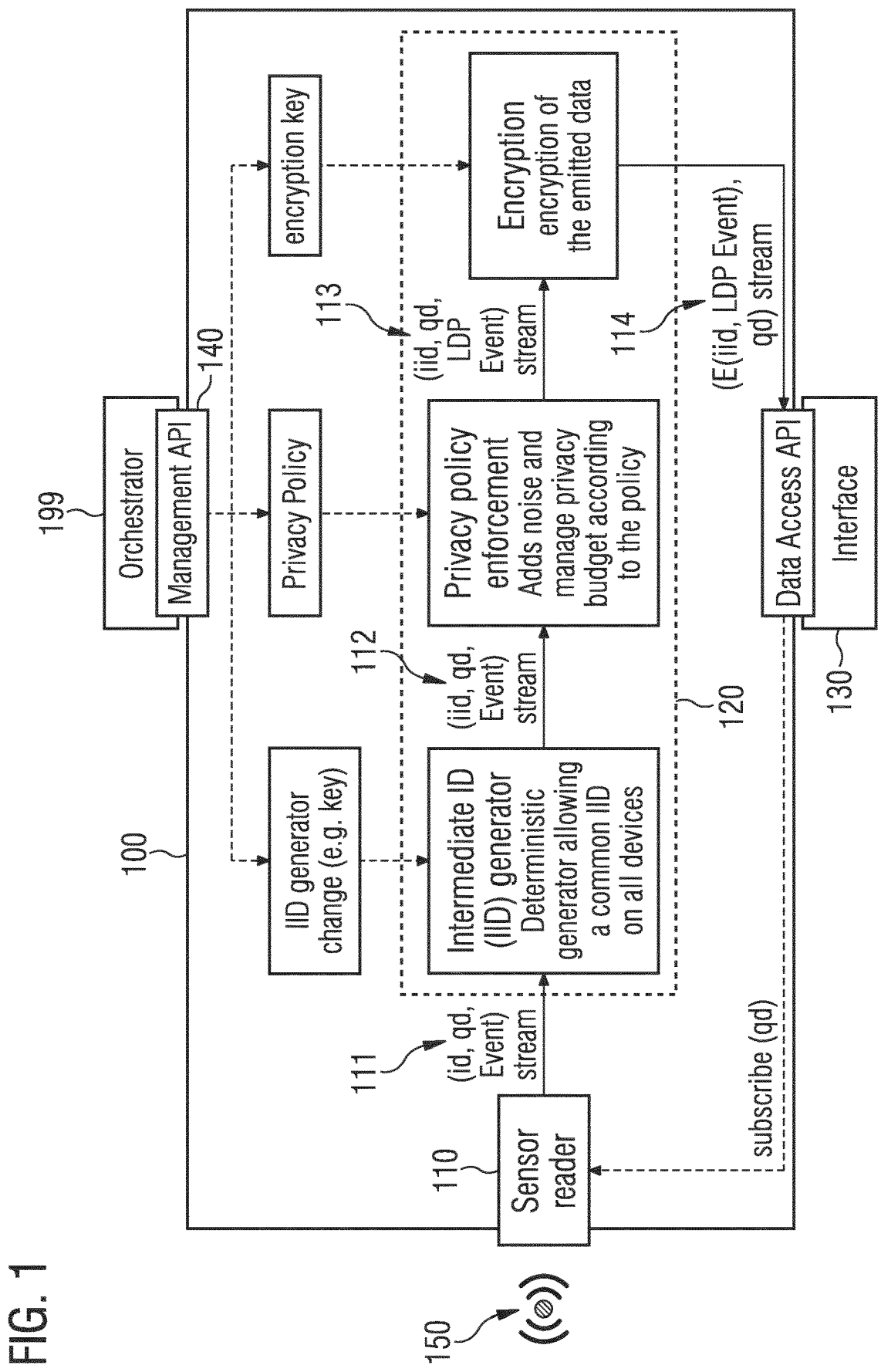
FIG. 1 illustrates an example of an apparatus for privacy preservation.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 illustrates an example of an apparatus 100 for privacy preservation.

The apparatus 100 comprises first interface circuitry 110 configured to read event data and identification data from a sensor 150. The sensor 150 is configured to generate the event data and the identification data upon detection of an event. The event data indicate (represent) the event detected by the sensor 150. The identification data indicate (represent) a first ID identifying a user involved in the event. The sensor 150 may be any type of sensor and be configured to sense any type of event. The data recorded by the sensor 150 may be of low dimension. For example, the sensor 150 may report summarized, event-like information. The first interface circuitry 110 and the sensor 150 may be coupled via a wired and/or wireless coupling. The first interface 110 is further configured to generate a data stream 111 comprising at least the event data and the identification data.

The apparatus 100 additionally comprise processing circuitry 120. For example, the processing circuitry 120 may be a single dedicated processor, a single shared processor, or a plurality of individual processors, some of which or all of which may be shared, a digital signal processor (DSP) hardware, an application specific integrated circuit (ASIC) or a field programmable gate array (FPGA). The processing circuitry 120 may optionally be coupled to, e.g., read only memory (ROM) for storing software, random access memory (RAM) and/or non-volatile memory. The processing circuitry 120 is coupled to the first interface circuitry 110.

The processing circuitry 120 is configured to generate an updated data stream 113 based on the data stream 111 by a) updating the first ID to a second ID (Intermediate ID, IID) in the identification data using a deterministic update function and b) by adding noise to at least the event data. The deterministic update function is a function which, given a particular input, will always produce the same output. For example, the deterministic update function may be a hashing function or an encryption function. The update of the ID may allow to protect the first ID sent by the sensor, even in the case the raw ID dictionary of the sensor 150 is not secured. The hashing or encryption is secret to avoid brute force inversion.

In the example of FIG. 1, the modification of the data stream 111 is done in two consecutive steps. First, the processing circuitry 120 updates the first ID to the second ID in the identification data using the deterministic update function in order to generate an intermediate data stream 112 comprising at least the event data and the updated identification data. Second, the processing circuitry 120 adds noise to the event data of the intermediate data stream 112 in order to generate the updated data stream 113. It is to be noted that the present disclosure is not limited to this order. In alternative examples, the processing circuitry 120 may first add noise to the event data and then update the first ID to the second ID. In still other examples, the processing circuitry 120 may add noise to the event data and update the first ID to the second ID in parallel (i.e. in one step).

The processing circuitry 120 is further configured to determine whether sufficient privacy (loss) budget is left for the updated data stream 113. The privacy (loss) budget is a quantity defining how much privacy may be lost (leaked) by publishing (outputting) the data in the updated data stream 113 and originates from the concept of Differential Privacy (DP). In other words, the processing circuitry 120 determines whether it is still tolerable (acceptable) to publish (output) the updated data stream 113 given the limited amount of privacy that may be lost.

If it is determined by the processing circuitry 120 that sufficient privacy budget is left for the updated data stream 113, the processing circuitry 120 is further configured to generate encrypted data (e.g. an encrypted data stream) 114 by encrypting the updated data stream 113.

The apparatus 100 comprises second interface circuitry 130 configured to output the encrypted data 114 for transmission to an external data aggregator. The external data aggregator is a computing system compiling data (i.e. information) from various entities such as the apparatus 100 with the intent to prepare combined data sets for data processing and/or analysis. The second interface circuitry 130 may further run (execute) one or more applications for providing the herein described functionality and may be understood as a Data Access Application Programming Interface (API).

The apparatus 100 may allow to randomize the event data by adding the noise. Further, the first (original) ID of the user may be protected due to the update of the identification data using the deterministic update function. The randomization of the event data, the update of the ID and the privacy budget check may allow to preserve the privacy of the user. In addition, the encryption of the updated data stream may allow to prevent, e.g., revealing the first (original) ID by brute force inversion.

The processing circuitry 120 may run (execute) one or more applications as indicated in FIG. 1 for providing the herein described functionalities.

The apparatus 100 may, e.g., be provided as a chipset for a device such as a mobile device (e.g. mobile phone or tablet-computer) or an IoT device. The apparatus 100 may enable Local Differential Privacy (LDP). According to examples, the apparatus 100 may be an LDP chipset. The proposed apparatus 100 (e.g. implemented as a chipset) may allow to secure the privacy of identified subjects at the source, while still allowing statistical analysis where identification is necessary. The apparatus 100 may allow to scramble events using LDP.

For example, a device according to present disclosure may at least comprise the apparatus 100, the sensor 150 and a transmitter (not illustrated in FIG. 1) coupled to the second interface circuitry 130. The transmitter may be configured to transmit the encrypted data to the data aggregator via one or more communication networks such as a Local Area Network (LAN), a Wireless LAN (WLAN), a Metropolitan Area Network (MAN), a Wide Area Network (WAN), a Global Area Network (GAN) or the Internet. The device and the first data aggregator may exchange data with each other by wired and/or wireless communication.

The processing circuitry 120 may optionally be further configured to add cryptographic nonce to the updated data stream 113 prior to encrypting the updated data stream 113. In particular, the processing circuitry 120 may add cryptographic nonce to one or more data elements of the updated data stream 113. For example, the processing circuitry 120 may add cryptographic nonce to the identification data of the updated data stream 113. Additionally or optionally, the processing circuitry 120 may add a nonce-header to the updated data stream 113. Adding cryptographic nonce may allow improved protection for the ID of the user. At the same time, adding cryptographic nonce may allow to recover any second ID generated by the apparatus 100 by the data aggregator.

If it is determined that no sufficient (i.e. only insufficient) privacy budget is left for the second ID, the processing circuitry 120 is configured to block transmission of data of the updated data stream 113 to the data aggregator. Accordingly, further transmission of data of the updated data stream 113 to the data aggregator may be interrupted at least temporarily once the privacy budget is exceeded. Similarly, the privacy of the user may be preserved by increasing the amount of noise added to at least the event data of the data stream 111 or by reducing the amount of data output by the apparatus 100 for transmission to the external data aggregator. For example, the amount of added noise may be increased if it is determined that the left privacy budget for the updated data stream 113 is below a predefined threshold.

For managing (adjusting) the operation (behavior) of the apparatus 100, the apparatus 100 further comprises third interface circuitry 140. The third interface circuitry 140 is accessible exclusively by an external orchestrator 199 orchestrating the apparatus 100 and the data aggregator. The orchestrator is a device or system that performs and supports automated configuration, coordination, and management of the system formed by the apparatus 100, the data aggregator and optionally further devices. The third interface circuitry 140 may run (execute) one or more applications for providing the herein described functionality and may be understood as a Management API. As the third interface circuitry 140 is accessible exclusively by the external orchestrator 199, only a trusted party can use it. For example, the third interface circuitry 140 is isolated from an Operating System (OS) of a device comprising the apparatus 100, which is in principle not trusted. Securing the third interface circuitry 140 may be done according to known techniques and is, hence, not described in detail in the present disclosure.

The third interface circuitry 140 is configured to receive configuration data from the orchestrator 199. Accordingly, the processing circuitry 120 is configured to adjust its operation based on the configuration data. In other words, the operational behavior of the processing circuitry 120 is adjustable by means of the configuration data. The configuration data may be manifold. In the following, some specific examples will be described. However, it is to be noted that the present disclosure is not limited to these specific examples.

For example, the configuration data may comprise noise level data indicating a target noise level. Accordingly, the processing circuitry 120 may be configured to add noise to at least the event data in the data stream 111 according to the target noise level. Similarly, the configuration data may comprise privacy budget data indicating the privacy budget. In other words, the configuration data may indicate the LDP policy by any data, setting, function etc. that define the noise level and the privacy budget management. The configuration data may further indicate other privacy policy information like a rate of replenishment of the privacy budget.

Additionally or alternatively, the configuration data may comprise cryptographic data (material) indicating (representing, including) an encryption key for the apparatus 100. Accordingly, the orchestrator may assign a specific (predefined) encryption key to the apparatus 100 (an exemplary assignment is described below with reference to FIG. 3). The processing circuitry 120 may be configured to encrypt the updated data stream 113 using the provided encryption key.

The configuration data may, e.g., comprise update function data indicating one or more parameters for the deterministic update function. The processing circuitry 120 may be configured to set the deterministic update function according to the one or more parameters indicated by the update function data. The update function data may allow to define the deterministic update function used for the generation of the second ID (IID).

In other words, the configuration data may indicate the settings for the encryption and anonymization functions of the apparatus 100.

The privacy preserving data collection by the apparatus 100 may be triggered by a query of the data aggregator. For example, the second interface circuitry 130 may be further configured to receive first query data from the data aggregator. The first query data indicate (represent) a query of the data aggregator for data of the sensor 150. Accordingly, the processing circuitry 120 may be configured to control the first interface circuitry 110 to read the event data and the identification data in response to receiving the query data. The query data may indicate (represent) various pieces of information related to the query of the data aggregator. For example, the query data may indicate (represent) an ID of the requestor, i.e. the data aggregator requesting the data of the sensor 150. The query data may alternatively be empty, for example in case the privacy budget management is not dependent on the requestor. In other words, the processing circuitry 120 may determine whether sufficient privacy budget is left for the updated data stream 113 based on the ID of the requestor of the data of the sensor 150.

The first interface circuitry 110 may be configured to generate the data stream 111 to comprise second query data indicating one or more parameters of the query of the data aggregator. The second query data are derived from the first query data. In other words, the first interface circuitry 110 may include at least some of the parameters included in the first query data into the data stream 111 as second query data. For example, the second query data may indicate (represent) a requestor ID of the data aggregator requesting the data of the sensor 150. Accordingly, the processing circuitry 120 may read the requestor ID from the data stream 111 for determining whether sufficient privacy budget is left for the updated data stream 113.

It is to be noted that the apparatus 100 may read more than one sensor. In particular, the apparatus 100 may be queried by the data aggregator to read more than one sensor. For example, the first query data may indicate (represent) a query of the data aggregator for data of the sensor 150 and another sensor (not illustrated in FIG. 1). Accordingly, the first interface circuitry 110 may optionally be configured to additionally read further event data from the other sensor. The further event data indicate an event detected by the other sensor. The event detected by the other sensor may be the same as the event detected by the sensor 150 or be different from the event detected by the sensor 150. Similar to what is described above, the first interface circuitry 110 may further be configured to read further identification data indicating a third ID identifying a user involved in the event detected by the other sensor. The user involved in the event detected by the other sensor may be the same user as the user involved in the event detected by the sensor 150 or be different from the user involved in the event detected by the sensor 150. Accordingly, the third ID may be identical to or be different from the first ID. The first interface circuitry 110 may generate the first data stream to additionally comprise the further event data and the further identification data read from the other sensor. The processing circuitry 120 may perform data processing on the further event data and the further identification data analogously to what is described above for the event data and the identification data read from the sensor 150.

Similarly, the apparatus 100 may handle multiple data streams in parallel. For example, the second interface may be further configured to receive third query data from another data aggregator. The third query data indicate (represent) a query of the other data aggregator for data of the sensor 150 and/or another sensor. Accordingly, the processing circuitry 120 may be configured to control the first interface circuitry 110 to read the event data and the identification data from the sensor 150 and/or the further event data and the further identification data from the other sensor in response to receiving the third query data. Similarly to what is described above, the first interface circuitry 110 may be configured to generate another data stream comprising at least the event data and the identification data read from the sensor 150 and/or the further event data and the further identification read from the other sensor.

The processing circuitry 120 may process the other data stream analogously to what is described above. For example, the processing circuitry 120 may be configured to generate another updated data stream based on the other data stream by updating the first ID to the second ID in the identification data of the other data stream using the deterministic update function, and by adding noise to at least the event data in the other data stream (similarly the third ID may be updated to a fourth ID in case the other data stream comprises the further identification data read from the other sensor, noise may be added to the further event data in case the other data stream comprises the further event data read from the other sensor). Further, the processing circuitry 120 may be configured to determine whether sufficient privacy budget is left for the other updated data stream. If it is determined that sufficient privacy budget is left for the other updated data stream, the processing circuitry 120 may be configured to generate other encrypted data by encrypting the other updated data stream. The second interface circuitry 130 may be configured to output the other encrypted data for transmission to the other data aggregator.

The handling (i.e. updating the ID and adding noise) of the data stream 111 and the other data stream by the apparatus 100 may be done in parallel and independent from each other. Also the privacy budgets used for handling the updated data stream 113 and the other updated data stream may be different from each other. In other words, the privacy budget for the other updated data stream may be different from the privacy budget for the updated data stream. In alternative examples, the same privacy budget may be used.

Figure 2:
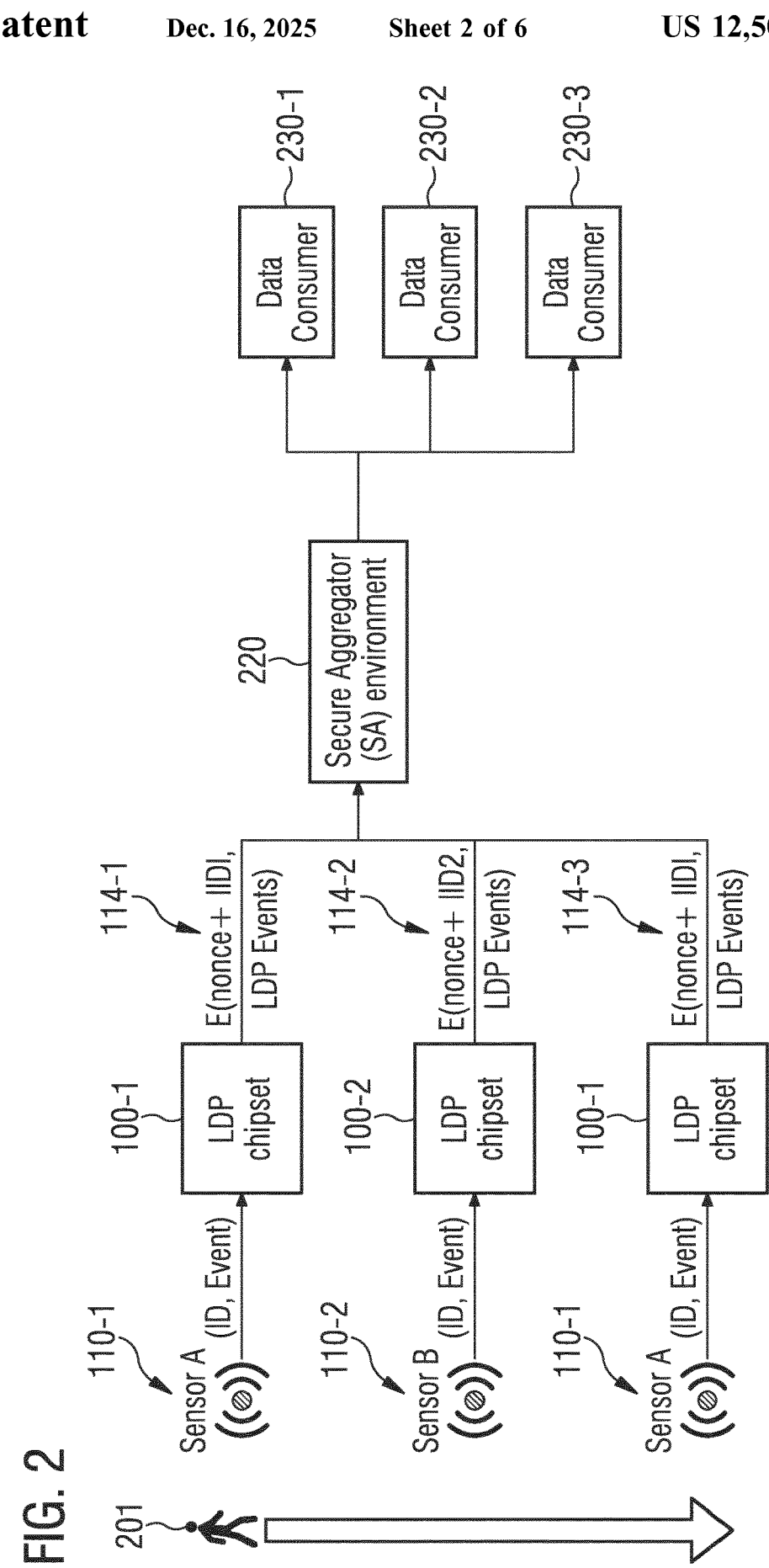
FIG. 2 illustrates an example of a system for data collection.

FIG. 2 illustrates a system using the apparatus 100 for collecting data traces of a user in a privacy preserving manner. The arrow to bottom in the left part of FIG. 2 illustrates a user 201's movement over time. The user 201 being a data subject may be sensed by multiple sensors over time. In the example of FIG. 2, two sensors 110-1 and 110-2 are illustrated. However, it is to be noted that any number of sensors N≥1 may be used. Similarly, a user may be sensed multiple times by a single sensor, i.e. by the same sensor. In the example of FIG. 2, the user 201 is sensed twice by the sensor 110-1. However, it is to be noted that any other of the sensors may as well sense the multiple times. In the example of FIG. 2, the sensor 110-1 senses the user 201 at a first time t1, the sensor 110-2 senses the user 201 at a second time t2>t1 and the sensor 110-1 senses the user 201 again a third time t3>t2.

Each of the sensors 110-1 and 110-2 is coupled with a respective apparatus 100-1, 100-2 for privacy preservations as described above with respect to FIG. 1. Accordingly, the ID of the user 201 provided by each of the sensors 110-1 and 110-2 is encrypted (scrambled) by of the apparatuses 100-1 and 100-2 using the respective deterministic update function. In the example of FIG. 2, each of the sensors 110-1 and 110-2 outputs identification data that indicate a first ID. As the apparatuses 100-1 and 100-2 use different deterministic update function, the apparatus 100-1 updates the first ID to a second ID (IID1) and the apparatus 100-2 updates the first ID to a third ID (IID2) different from the second ID. In other words, the apparatuses 100-1 and 100-2 update the first ID provided by the sensors differently. The result of the ID update may vary over time for the respective apparatus (e.g. the apparatus 100-1).

Further, the event data provided by each of the sensors 110-1 and 110-2 are randomized according to the LDP principles by the apparatuses 100-1 and 100-2 as described above. The randomized events may be understood as LDP events.

Accordingly, the apparatus 100-1 outputs first encrypted data 114-1 comprising the anonymized and scrambled data of the sensor 110-1 when sensing the user 201 at the first time t1. Similarly, the apparatus 100-1 outputs second encrypted data 114-2 comprising the anonymized and scrambled data of the sensor 110-2 when sensing the user 201 at the second time t2. As the sensor 110-1 senses the user 201 again at the third time t3, the apparatus 100-1 subsequently outputs third encrypted data 114-3 comprising the anonymized and scrambled data of the sensor 110-1 when sensing the user 201 at the third time t3. The first encrypted data 114-1 and the third encrypted data 114-3 indicate (represent) the same second ID (IID1) as the ID provided by the sensor 110-1 is processed by the same apparatus 110-1.

To the contrary, the second encrypted data 114-2 indicate (represent) the third ID (IID2) as the ID provided by the sensor 110-2 is processed by the apparatus 110-2 using another deterministic update function.

The pieces of encrypted data 114-1, 114-2 and 114-3 are aggregated to a data aggregator (Secure Aggregator, SA) 220. The data aggregator 220 compiles the encrypted data 114-1, 114-2 and 114-3 originating from the sensors 110-1 and 110-2 and prepares one or more combined data sets for data processing by various data consumers. In the example of FIG. 2, three data consumers 230-1, 230-2 and 230-3 are illustrated. However, it is to be noted that the present disclosure is not limited thereto. In general, the data aggregator may serve any number of data consumers.

Figure 3:
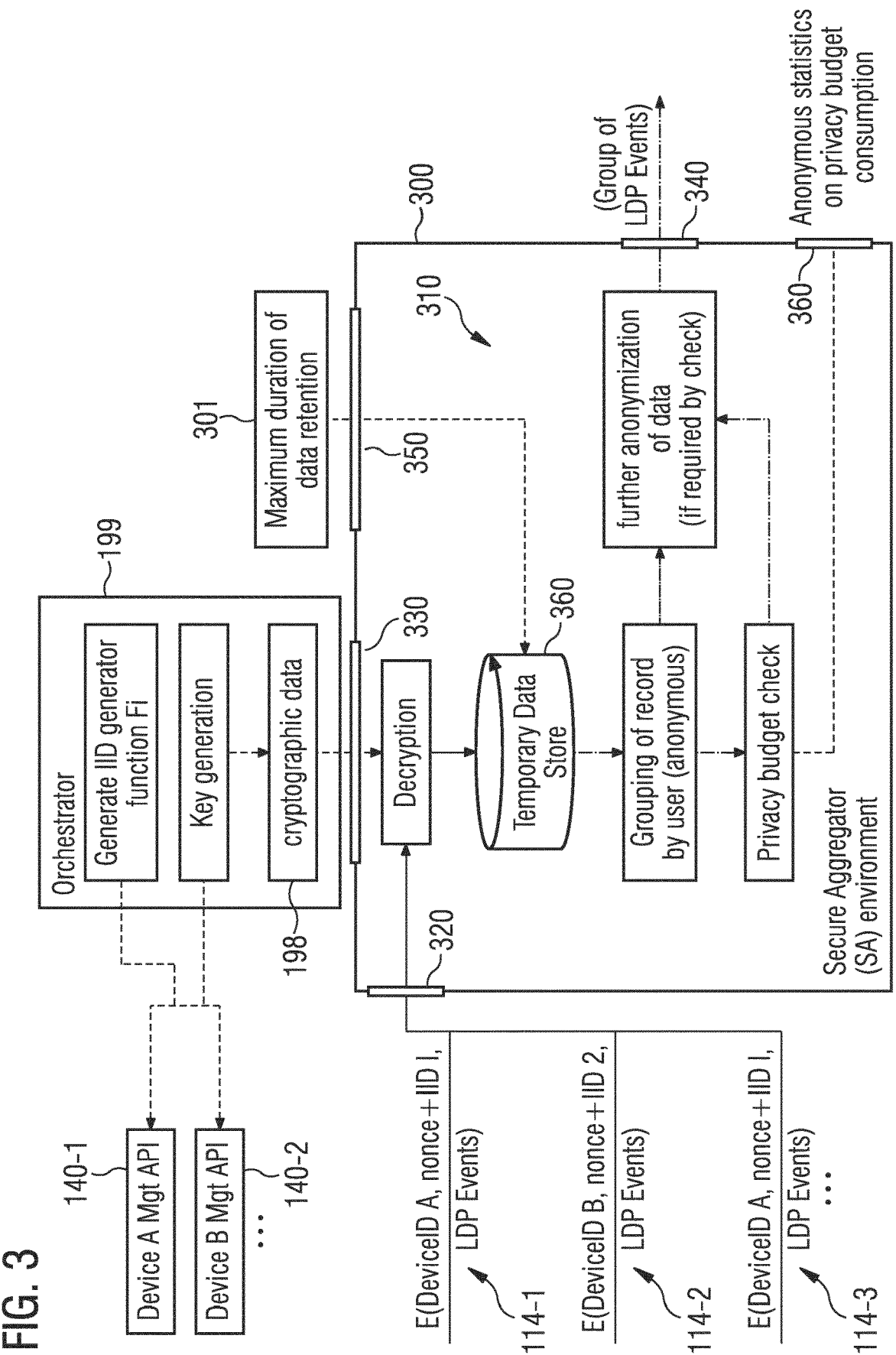
FIG. 3 illustrates an example of a computing system acting as a data aggregator.

An exemplary computing system 300 that may be used as the data aggregator 220 is illustrated in FIG. 3. Further illustrated in FIG. 3 is the orchestrator 199 orchestrating the apparatuses for privacy preservation and the data aggregator (i.e. the computing system 300). In the example of FIG. 3, it is assumed that the orchestrator 199 orchestrates at least the apparatuses 100-1 and 100-2 described above in connection with FIG. 2.

As described above with reference to FIG. 1, the orchestrator 199 generates the respective deterministic update function Fi for each of the apparatuses for privacy preservation. Additionally, the orchestrator generates the respective cryptographic data for the encrypted data transmission for each of the apparatuses for privacy preservation. As indicated in FIG. 3, the respective deterministic update function and the respective encryption key is transmitted by the orchestrator to the respective third interface circuitry of the apparatuses for privacy preservation. In FIG. 3, the third interface circuitries 140-1 and 140-2 of the apparatuses 100-1 and 100-2 described above in connection with FIG. 2 are illustrated as examples.

Similarly, the orchestrator provides the respective cryptographic data (e.g. a decryption key) to the computing system 300 such that the computing system 300 is able to decrypt the respective encrypted data provided by the apparatuses for privacy preservation.

The computing system 300 comprises processing circuitry 310 and at least first interface circuitry 320, second interface circuitry 330 and third interface circuitry 340. The processing circuitry 310 is configured to control the computing system 300 to act as data aggregator for a plurality of devices such as the devices comprising the apparatuses for privacy preservation 100-1 and 100-2 described above in connection with FIG. 2. For example, the processing circuitry 310 may be a single dedicated processor, a single shared processor, or a plurality of individual processors, some of which or all of which may be shared, a DSP hardware, an ASIC or a FPGA. The processing circuitry 310 may optionally be coupled to, e.g., ROM for storing software, RAM and/or non-volatile memory.

In particular, the processing circuitry 310 controls the computing system 300 to act as data aggregator for a plurality of devices by controlling the first interface circuitry 320 to receive a plurality of pieces of encrypted data from the plurality of devices. In the example of FIG. 3, the first interface circuitry 320 receives the pieces of encrypted data 114-1, 114-2 and 114-3 from the devices comprising the apparatuses for privacy preservation 100-1 and 100-2 described above in connection with FIG. 2. As described above, each piece of encrypted data comprises at least event data indicating an event detected by a sensor of the respective device and identification data indicating an ID for a user involved in the event. As described above, the ID contained in the respective piece of encrypted data is anonymized (scrambled). The pieces of encrypted data 114-1, 114-2 and 114-3 are encrypted by the apparatuses for privacy preservation 100-1 and 100-2 using the respective cryptographic data provided by the orchestrator 199.

The orchestrator 199 provides the respective cryptographic data 198 (e.g. a decryption key) to the computing system 300 such that the computing system 300 is able to decrypt the respective piece of encrypted data 114-1, 114-2 and 114-3. Accordingly, the processing circuitry 310 controls the computing system 300 to act as data aggregator for the plurality of devices by controlling the second interface circuitry 330 to receive from the orchestrator 199 cryptographic data 198 (e.g. indicating the respective decryption key for the plurality of devices).

Further, the processing circuitry 310 performs decrypting the plurality of pieces of encrypted data 114-1, 114-2 and 114-3 using the cryptographic data 198 in order to generate a plurality of pieces of decrypted data. The processing circuitry 310 stores the plurality of pieces of decrypted data in a data storage 360. The data storage 360 is a non-transitory machine-readable medium for storing data. For example, the data storage 360 may comprise a magnetic data storage and/or an electronic data storage.

Further, the processing circuitry 310 performs grouping pieces of decrypted data in the data storage 360 comprising identification data that indicate (represent) the same ID in order to generate a respective group for each ID. In other words, the processing circuitry 310 selects those pieces of decrypted data in the data storage 360 that indicate the same ID. Accordingly, the event data for a respective specific ID can be grouped (aggregated). For example, the processing circuitry 310 may select the decrypted data in the data storage 360 indicating the second ID (IID1) and group them. Similarly, the processing circuitry 310 may select the decrypted data in the data storage 360 indicating the third ID (IID2) and group them.

The processing circuitry 310 further determines whether sufficient privacy budget is left for the ID of the respective group. For example, the processing circuitry 310 may determine whether sufficient privacy budget is left for the group belonging to the second ID (IID1). Similarly, the processing circuitry 310 may determine whether sufficient privacy budget is left for the group belonging to the third ID (IID2).

If it is determined that sufficient privacy budget is left for the ID of the respective group, the processing circuitry 310 controls the third interface circuitry 340 to output the event data of the respective group. For example, if it is determined that sufficient privacy budget is left for the group belonging to the second ID (IID1), the event data of this group are output via the third interface circuitry 340. Accordingly, the event data of the respective group may be provided to a data consumer such as one of the data consumers 230-1, 230-2 and 230-3 illustrated in FIG. 2 for further analysis.

The computing system 300 may enable to group the events received from the plurality of devices using secure computation, without human intervention. The data aggregator environment (process) provided by the computing system 300 may allow to check the privacy budget for each ID and, hence, allow to preserve privacy. The security of the central instances processing the gathered data is crucial to guarantee the overall security of the system. Compared to an approach in which the reconstruction of the final ID is done in the same environment that is used to serve the data to consumers, the computing system 300 is less risky. As the output amount of information linked to a specific ID is managed by the computing system 300, it is not possible for a heavy user to exceed the privacy budget even in case the event data is aggregated from several devices.

The processing circuitry 310 may be configured to control the third interface circuitry 340 to output the event data of the respective group free from data indicating the ID of the respective group. In other words, the data subject identifiers may be discarded once the aggregation is done. Although, the IDs in the received pieces of encrypted data 114-1, 114-2 and 114-3 are already anonymized by the apparatuses for privacy preservation 110-1 and 110-2, outputting the event data of the respective group free from data indicating the ID of the respective group may allow to further improve the privacy preservation.

If it is determined that the left privacy budget for the ID of the respective group is below a predefined threshold, the processing circuitry 310 may be further configured to apply an anonymization on the event data of the respective group. For example, the processing circuitry 310 may add additional noise to the event data of the respective group for further anonymizing the event data of the respective group.

If it is determined that no sufficient (i.e. only insufficient) privacy budget is left for the ID of the respective group, the processing circuitry 310 may be configured to block output of data of the respective group. Accordingly, further transmission of data of the respective group to a data consumer may be interrupted at least temporarily once the privacy budget is exceeded.

The processing circuitry 310 may further provide statistics on privacy budget consumption. For example, the processing circuitry 310 may determine anonymous statistics on privacy budget consumption based on results of the determination whether sufficient privacy budget is left for the ID of the respective group. The processing circuitry 310 may control fifth interface circuitry 360 of the computing system 300 to output the anonymous statistics on privacy budget consumption. The anonymous statistics on privacy budget consumption may allow for global privacy policy optimization. For example, the orchestrator 199 may adjust one or more settings of one or more of the apparatuses for privacy preservation 100-1 and 100-2 based on the anonymous statistics on privacy budget consumption.

The computing system 300 may only serve temporarily as data aggregator in order to further increase the security of the data aggregation. For example, after a predetermined retention time lapses, the processing circuitry 310 may be configured to control the computing system 300 to stop acting as the data aggregator for the plurality of devices and to delete all data from the computing system 300 stored while acting as the data aggregator for the plurality of devices. For example, the storage 360 may be cleared such that all pieces of decrypted data are deleted. Similarly, all cryptographic material received from the orchestrator 199 while acting as the data aggregator for the plurality of devices may be deleted from the computing system 300. In other words, the computing system 300 may destroy the data aggregator functionality after a predetermined retention time lapses.

For example, the computing system 300 may comprise fourth interface circuitry 350 configured to receive retention time data 301 indicating a target retention time. Accordingly, the processing circuitry 310 may be configured to set the retention time to the target retention time. The retention time data 301 may, e.g., be received from (provided by) the orchestrator 199 or any other suitable entity.

The computing system 300 may restage the data aggregator functionality after destruction. For example, the data aggregator functionality may be destroyed and restaged periodically by the computing system 300.

A data aggregation system such as the one illustrated in FIG. 2 may optionally comprise more than one data aggregator. For example, for further increased security and/or anonymity, the grid of devices may be sharded and each managed by a different data aggregator instance. In that case, users identified by devices in different segments of the grid would be considered as different subjects. Furthermore, the system state may be reset periodically to mitigate the risk of a specific master key leakage.

Figure 4:
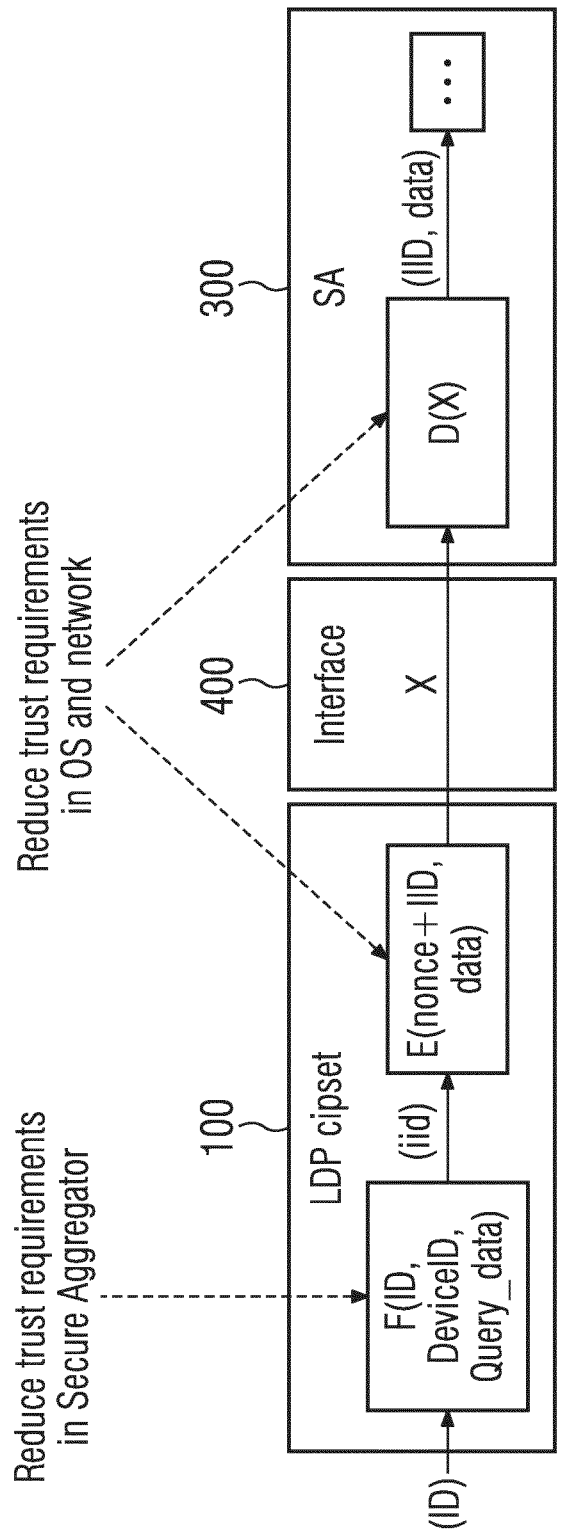
FIG. 4 illustrates an exemplary encryption scheme.

FIG. 4 illustrates an exemplary overview on the ID encryption scheme described above.

The ID provided by the sensor is to be hidden from any untrusted entity in order to preserve the user's identity. Therefore, the data is encrypted (indicated by function E in FIG. 4) by the apparatus 100 for privacy preservation and subsequently decrypted (indicated by function D in FIG. 4) by the computer system 300 acting as data aggregator. As indicated in FIG. 4, cryptographic nonce such as a random nonce header may be added to further increase the security. The encryption and decryption may allow to reduce the trust requirements for any interface 400 such as an OS of a device comprising the apparatus 100 and/or one or more communication networks between the apparatus 100 and the computer system 300 acting as data aggregator.

As the security of the ID space is not controlled in the proposed architecture, a compromised data aggregator might link the first ID as output by the sensor to the second ID (IID) provided by the apparatus 100 to the computer system 300 acting as data aggregator by brute force inversion in case the deterministic update function (indicated by function F in FIG. 4) was public.

To mitigate this risk, a private deterministic update function is used. As described above, the orchestrator 199 may manage the deterministic update function for the apparatus 100 for privacy preservation and ensure that the deterministic update function remains secret. For example, the deterministic update function may be set when the system is instantiated and the encryption key is set on the apparatus 100. Re-identification of the data at the computer system 300 acting as data aggregator would require obtaining the deterministic update function from the apparatus 100 (and optionally the other apparatuses for privacy preservation that provide their data to the computer system 300 acting as data aggregator). Therefore, the security of the proposed data aggregation architecture is very high.

Figure 5:
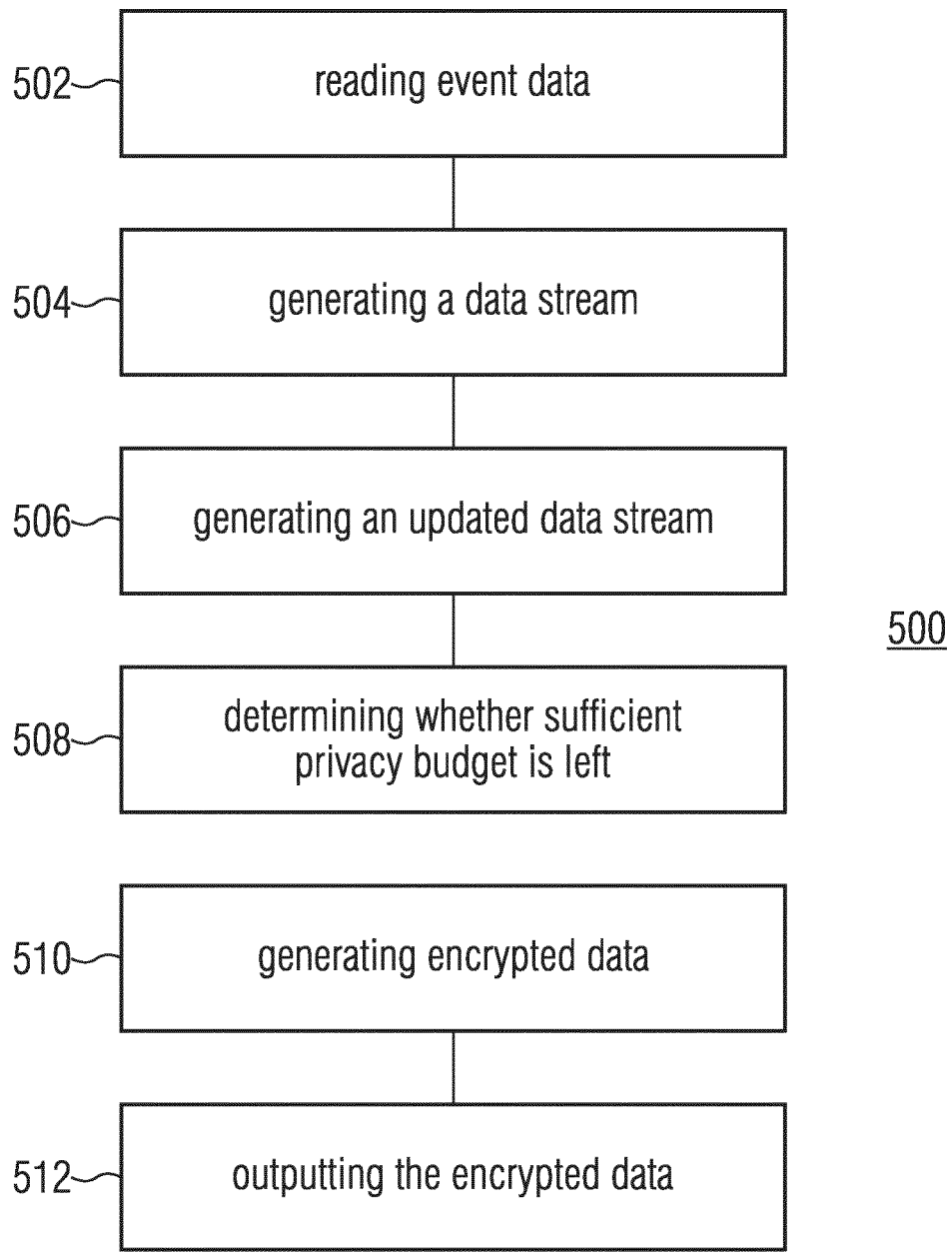
FIG. 5 illustrates a flowchart of an example of a method for privacy preservation.

For further highlighting the functionality of the apparatus for privacy preservation described above, FIG. 5 illustrates a flowchart of a method 500 for privacy preservation. The method 500 comprises reading 502, from a sensor, event data indicating an event detected by the sensor and identification data indicating a first ID. The first ID identifies a user involved in the event. Further, the method 500 comprises generating 504 a data stream comprising at least the event data and the identification data. The method 500 additionally comprises generating 506 an updated data stream based on the data stream by updating the first ID to a second ID in the identification data using a deterministic update function, and by adding noise to at least the event data. Further, the method 500 comprises determining 508 whether sufficient privacy budget is left for the updated data stream. If it is determined that sufficient privacy budget is left for the updated data stream, the method 500 comprises generating 510 encrypted data by encrypting the updated data stream. In addition, the method 500 comprises outputting 512 the encrypted data for transmission to an external data aggregator.

The method 500 may allow to preserve the privacy of the user as set out above for the apparatus 100.

More details and aspects of the method 500 are explained in connection with the proposed technique or one or more examples described above (e.g. FIGS. 1, 2 and 4). The method 500 may comprise one or more additional optional features corresponding to one or more aspects of the proposed technique or one or more examples described above.

Figure 6:
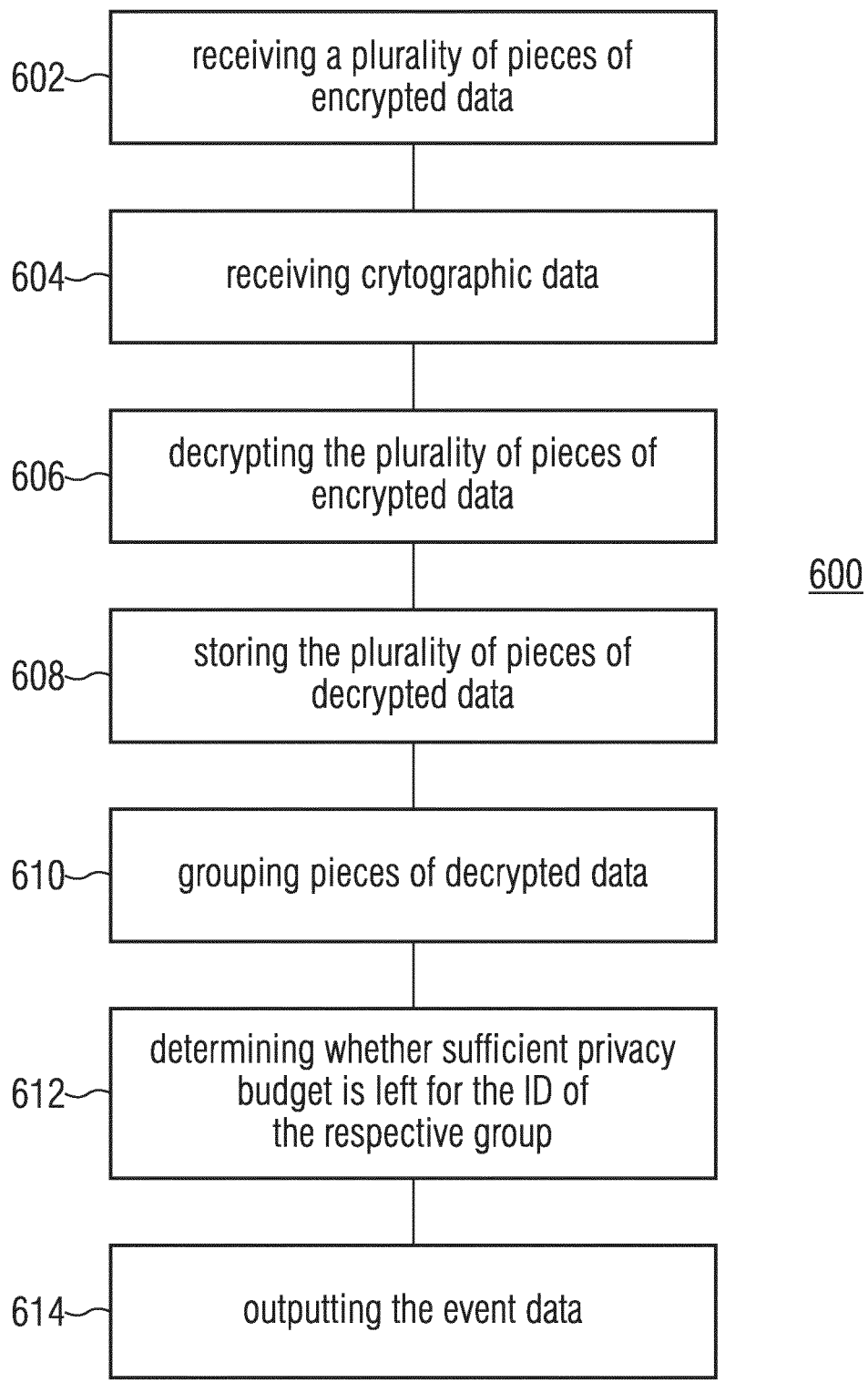
FIG. 6 illustrates a flowchart of an example of a method for controlling a computing system to act as data aggregator for a plurality of devices.

For further highlighting the functionality of the data aggregator described above, FIG. 6 illustrates a flowchart of a method 600 for controlling a computing system to act as data aggregator for a plurality of devices. The method 600 comprises controlling 602 first interface circuitry of the computing system to receive a plurality of pieces of encrypted data from the plurality of devices. Each piece of encrypted data comprises at least event data indicating an event detected by a sensor of the respective device and identification data indicating an ID for a user involved in the event. The method 600 further comprises controlling 604 second interface circuitry of the computing system to receive, from an external orchestrator orchestrating the data aggregator and the plurality of devices, cryptographic data. In addition, the method 600 comprises decrypting 606 the plurality of pieces of encrypted data using the cryptographic data in order to generate a plurality of pieces of decrypted data. Further, the method 600 comprises storing 608 the plurality of pieces of decrypted data in a data storage. In addition, the method 600 comprises grouping 610 pieces of decrypted data in the data storage comprising identification data that indicate the same ID in order to generate a respective group for each ID. The method 600 comprises determining 612 whether sufficient privacy budget is left for the ID of the respective group. If it is determined that sufficient privacy budget is left for the ID of the respective group, the method 600 comprises controlling 614 third interface circuitry of the computing system to output the event data of the respective group.

The method 600 may allow to preserve the privacy of the user as set out above for the computing system 300.

More details and aspects of the method 600 are explained in connection with the proposed technique or one or more examples described above (e.g. FIGS. 3 and 4). The method 600 may comprise one or more additional optional features corresponding to one or more aspects of the proposed technique or one or more examples described above.

Examples of the present disclosure may provide a privacy-preserving collection of data traces of identified individuals across multiple devices. Further, the proposed technique may enable privacy enforcement on IoT sensing devices.

The secure hardware component 100 (e.g. a chipset), when integrated in sensing devices (e.g. IoT sensors, mobile phones) may identify data subjects. The computing system 300 as a secure processing component (secure aggregator) may aggregate events from a same user across a network of sensing devices without disclosing identifiable data. A combination of encryption and statistical anonymization (LDP) may allow to guarantee that an individual maximum privacy budget is respected by the system. When collecting the data, the privacy of a data subject (e.g. in the case of untrusted applications) across multiple sensing devices may be protected according to the proposed architecture. Further, the cost of securing data for trusted applications may be reduced according to the proposed architecture.

The following examples pertain to further embodiments:
(1) An apparatus for privacy preservation, the apparatus comprising:
first interface circuitry configured to read, from a sensor, event data indicating an event detected by the sensor and identification data indicating a first Identifier, ID, the first ID identifying a user involved in the event, wherein the first interface circuitry is further configured to generate a data stream comprising at least the event data and the identification data;
processing circuitry configured to:
    generate an updated data stream based on the data stream by updating the first ID to a second ID in the identification data using a deterministic update function, and by adding noise to at least the event data;
    determine whether sufficient privacy budget is left for the updated data stream; and
    if it is determined that sufficient privacy budget is left for the updated data stream, generate encrypted data by encrypting the updated data stream; and
second interface circuitry configured to output the encrypted data for transmission to an external data aggregator.
(2) The apparatus of (1), wherein the processing circuitry is configured to add cryptographic nonce to the updated data stream prior to encrypting the updated data stream.
(3) The apparatus of (1) or (2), further comprising: third interface circuitry accessible exclusively by an external orchestrator orchestrating the apparatus and the data aggregator, wherein the third interface circuitry is configured to receive configuration data from the orchestrator, and wherein the processing circuitry is configured to adjust its operation based on the configuration data.
(4) The apparatus of (3), wherein the configuration data comprise noise level data indicating a target noise level, and wherein the processing circuitry is configured to add noise to at least the event data in the data stream according to the target noise level.
(5) The apparatus of (3) or (4), wherein the configuration data comprise privacy budget data indicating the privacy budget.
(6) The apparatus of any one of (3) to (5), wherein the configuration data comprise encryption key data indicating an encryption key for the apparatus, wherein the processing circuitry is configured to encrypt the updated data stream using the encryption key.
(7) The apparatus of any one of (3) to (6), wherein the configuration data comprise update function data indicating one or more parameters for the deterministic update function, and wherein the processing circuitry is configured to set the deterministic update function according to the one or more parameters indicated by the update function data.
(8) The apparatus of any one of (1) to (7), wherein the second interface circuitry is further configured to receive, from the data aggregator, first query data indicating a query of the data aggregator for data of the sensor, wherein the processing circuitry is configured to control the first interface circuitry to read the event data and the identification data in response to receiving the query data.
(9) The apparatus of (8), wherein the first interface circuitry is further configured to generate the data stream to comprise second query data indicating one or more parameters of the query of the data aggregator.

(10) The apparatus of (8) or (9), wherein the second interface circuitry is further configured to receive, from another data aggregator, third query data indicating a query of the other data aggregator for data of the sensor, wherein the processing circuitry is configured to control the first interface circuitry to read the event data and the identification data in response to receiving the third query data, wherein the first interface circuitry is further configured to generate another data stream comprising at least the event data and the identification data, and wherein the processing circuitry is further configured to:

generate another updated data stream based on the other data stream by updating the first ID to a second ID in the identification data using the deterministic update function, and by adding noise to at least the event data;

determine whether sufficient privacy budget is left for the other updated data stream;

if it is determined that sufficient privacy budget is left for the other updated data stream, generate other encrypted data by encrypting the other updated data stream, wherein the second interface circuitry configured to output the other encrypted data for transmission to the other data aggregator.

(11) The apparatus of (10), wherein the privacy budget for the other updated data stream is different from the privacy budget for the updated data stream.

(12) The apparatus of any one of (1) to (11), wherein, if it is determined that no sufficient privacy budget is left for the updated data stream, the processing circuitry is configured to block transmission of data of the updated data stream to the data aggregator.

(13) A device, comprising:

an apparatus for privacy preservation according to any one of (1) to (12);

a sensor configured to generate the event data and the identification data upon detection of the event; and a transmitter coupled to the second interface circuitry and configured to transmit the encrypted data to the data aggregator via a communication network.

(14) A computing system comprising first interface circuitry, second interface circuitry, third interface circuitry and processing circuitry, wherein the processing circuitry is configured to control the computing system to act as data aggregator for a plurality of devices by:

controlling the first interface circuitry to receive a plurality of pieces of encrypted data from the plurality of devices, wherein each piece of encrypted data comprises at least event data indicating an event detected by a sensor of the respective device and identification data indicating an Identifier, ID, for a user involved in the event;

controlling the second interface circuitry to receive, from an external orchestrator orchestrating the data aggregator and the plurality of devices, cryptographic data;

decrypting the plurality of pieces of encrypted data using the cryptographic data in order to generate a plurality of pieces of decrypted data;

storing the plurality of pieces of decrypted data in a data storage;

grouping pieces of decrypted data in the data storage comprising identification data that indicate the same ID in order to generate a respective group for each ID; and determining whether sufficient privacy budget is left for the ID of the respective group; and controlling the third interface circuitry to output the event data of the respective group if it is determined that sufficient privacy budget is left for the ID of the respective group.

(15) The computing system of (14), wherein the processing circuitry is configured to control the computing system to act as the data aggregator for the plurality of devices by controlling the third interface circuitry to output the event data of the respective group free from data indicating the ID of the respective group.

(16) The computing system of (14) or (15), wherein the processing circuitry is configured to control the computing system to act as the data aggregator for the plurality of devices by applying an anonymization on the event data of the respective group if it is determined that the left privacy budget for the ID of the respective group is below a predefined threshold.

(17) The computing system of any one of (14) to (16), wherein the processing circuitry is configured to control the computing system to act as the data aggregator for the plurality of devices by determining anonymous statistics on privacy budget consumption based on results of the determination whether sufficient privacy budget is left for the ID of the respective group.

(18) The computing system of any one of (14) to (17), wherein, after a predetermined retention time lapses, the processing circuitry is configured to control the computing system to stop acting as the data aggregator for the plurality of devices and to delete all data from the computing system stored while acting as the data aggregator for the plurality of devices.

(19) The computing system of (18), further comprising:

fourth interface circuitry configured to receive retention time data indicating a target retention time, wherein the processing circuitry is configured to set the retention time to the target retention time.

(20) A method for privacy preservation, the method comprising:

reading, from a sensor, event data indicating an event detected by the sensor and identification data indicating a first Identifier, ID, the first ID identifying a user involved in the event;

generating a data stream comprising at least the event data and the identification data;

generating an updated data stream based on the data stream by updating the first ID to a second ID in the identification data using a deterministic update function, and by adding noise to at least the event data;

determining whether sufficient privacy budget is left for the updated data stream;

if it is determined that sufficient privacy budget is left for the updated data stream, generating encrypted data by encrypting the updated data stream; and outputting the encrypted data for transmission to an external data aggregator.

(21) A method for controlling a computing system to act as data aggregator for a plurality of devices, the method comprising:

controlling first interface circuitry of the computing system to receive a plurality of pieces of encrypted data from the plurality of devices, wherein each piece of encrypted data comprises at least event data indicating an event detected by a sensor of the respective device and identification data indicating an Identifier, ID, for a user involved in the event;

controlling second interface circuitry of the computing system to receive, from an external orchestrator orchestrating the data aggregator and the plurality of devices, cryptographic data;

decrypting the plurality of pieces of encrypted data using the cryptographic data in order to generate a plurality of pieces of decrypted data;

storing the plurality of pieces of decrypted data in a data storage;

grouping pieces of decrypted data in the data storage comprising identification data that indicate the same ID in order to generate a respective group for each ID;

determining whether sufficient privacy budget is left for the ID of the respective group; and controlling third interface circuitry of the computing system to output the event data of the respective group if it is determined that sufficient privacy budget is left for the ID of the respective group.

(22) A non-transitory machine-readable medium having stored thereon a program having a program code for performing the method according to any one of (1) to (21), when the program is executed on a processor or a programmable hardware.

(23) A program having a program code for performing the method according to any one of (1) to (21), when the program is executed on a processor or a programmable hardware.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. An apparatus for privacy preservation, the apparatus comprising:

first interface circuitry configured to read, from a sensor, event data indicating an event detected by the sensor and identification data indicating a first Identifier, ID, wherein the first ID is generated by the sensor to uniquely identify a specific user involved in the event, wherein the first interface circuitry is further configured to generate a data stream comprising the event data and the identification data;

processing circuitry configured to:
generate an updated data stream based on the data stream by updating the first ID to a second ID that is an intermediate ID (IID) in the identification data using a deterministic update function that is a hashing function or an encryption function that remains secret to avoid brute force inversion, and by adding noise to the event data to randomize the event data for privacy preservation, wherein the noise is calibrated based on a privacy budget;

determine whether sufficient privacy budget is left for the updated data stream by determining whether publishing the updated data stream would exceed a privacy budget quantity that defines how much privacy is lost;

add cryptographic nonce to the updated data stream prior to encrypting the updated data stream; and if it is determined that sufficient privacy budget is left for the updated data stream, generate encrypted data by encrypting the updated data stream; and second interface circuitry configured to output the encrypted data for transmission to an external data aggregator.

2. The apparatus of claim 1, further comprising:
third interface circuitry accessible exclusively by an external orchestrator orchestrating the apparatus and the data aggregator, wherein the third interface circuitry is configured to receive configuration data from the orchestrator, and wherein the processing circuitry is configured to adjust its operation based on the configuration data.

3. The apparatus of claim 2, wherein the configuration data comprise noise level data indicating a target noise level, and wherein the processing circuitry is configured to add noise to at least the event data in the data stream according to the target noise level.

4. The apparatus of claim 2, wherein the configuration data comprise privacy budget data indicating the privacy budget.

5. The apparatus of claim 2, wherein the configuration data comprise encryption key data indicating an encryption key for the apparatus, wherein the processing circuitry is configured to encrypt the updated data stream using the encryption key.

6. The apparatus of claim 2, wherein the configuration data comprise update function data indicating one or more parameters for the deterministic update function, and wherein the processing circuitry is configured to set the deterministic update function according to the one or more parameters indicated by the update function data.

7. The apparatus of claim 1, wherein the second interface circuitry is further configured to receive, from the data aggregator, first query data indicating a query of the data aggregator for data of the sensor, wherein the processing circuitry is configured to control the first interface circuitry to read the event data and the identification data in response to receiving the query data.

8. The apparatus of claim 7, wherein the first interface circuitry is further configured to generate the data stream to comprise second query data indicating one or more parameters of the query of the data aggregator.

9. The apparatus of claim 7, wherein the second interface circuitry is further configured to receive, from another data aggregator, third query data indicating a query of the other data aggregator for data of the sensor, wherein the processing circuitry is configured to control the first interface circuitry to read the event data and the identification data in response to receiving the third query data, wherein the first interface circuitry is further configured to generate another data stream comprising at least the event data and the identification data, and wherein the processing circuitry is further configured to:
generate another updated data stream based on the other data stream by updating the first ID to a second ID in the identification data using the deterministic update function, and by adding noise to at least the event data;
determine whether sufficient privacy budget is left for the other updated data stream;
if it is determined that sufficient privacy budget is left for the other updated data stream, generate other encrypted data by encrypting the other updated data stream,
wherein the second interface circuitry configured to output the other encrypted data for transmission to the other data aggregator.

10. The apparatus of claim 9, wherein the privacy budget for the other updated data stream is different from the privacy budget for the updated data stream.

11. The apparatus of claim 1, wherein, if it is determined that no sufficient privacy budget is left for the updated data stream, the processing circuitry is configured to block transmission of data of the updated data stream to the data aggregator.

12. A device, comprising:
an apparatus for privacy preservation according to claim 1;
the sensor configured to generate the event data and the identification data upon detection of the event; and
a transmitter that is separate from the apparatus and coupled to the second interface circuitry of the apparatus and configured to transmit the encrypted data to an external data aggregator via a communication network.

13. A computing system comprising first interface circuitry, second interface circuitry, third interface circuitry and processing circuitry, wherein the processing circuitry is configured to control the computing system to act as data aggregator for a plurality of devices by:
controlling the first interface circuitry to receive a plurality of pieces of encrypted data from the plurality of devices, wherein each piece of encrypted data comprises at least event data indicating an event detected by a sensor of the respective device and identification data indicating an Identifier, ID, for a user involved in the event;
controlling the second interface circuitry to receive, from an external orchestrator orchestrating the computing system acting as the data aggregator and the plurality of devices, cryptographic data comprising decryption keys;
decrypting the plurality of pieces of encrypted data using the cryptographic data in order to generate a plurality of pieces of decrypted data comprising decrypted event data and decrypted identification data;
storing the plurality of pieces of decrypted data in a data storage that is part of the computing system;
grouping the pieces of decrypted data in the data storage comprising identification data indicating an identical ID in order to generate a respective group for each unique ID among all the pieces of decrypted data;
adding cryptographic nonce to the updated data stream prior to encrypting the updated data stream;
determining whether sufficient privacy budget is left for the unique ID of the respective group by determining whether outputting event data for that unique ID would exceed a privacy budget quantity; and
controlling the third interface circuitry to output only the decrypted event data of the respective group if it is determined that sufficient privacy budget is left for the unique ID of the respective group.

14. The computing system of claim 13, wherein the processing circuitry is configured to control the computing system to act as the data aggregator for the plurality of devices by controlling the third interface circuitry to output the event data of the respective group free from data indicating the ID of the respective group.

15. The computing system of claim 13, wherein the processing circuitry is configured to control the computing system to act as the data aggregator for the plurality of devices by applying an anonymization on the event data of the respective group if it is determined that the left privacy budget for the ID of the respective group is below a predefined threshold.

16. The computing system of claim 13, wherein the processing circuitry is configured to control the computing system to act as the data aggregator for the plurality of devices by determining anonymous statistics on privacy budget consumption based on results of the determination whether sufficient privacy budget is left for the ID of the respective group.

17. The computing system of claim 13, wherein, after a predetermined retention time lapses, the processing circuitry is configured to control the computing system to stop acting as the data aggregator for the plurality of devices and to delete all data from the computing system stored while acting as the data aggregator for the plurality of devices.

18. The computing system of claim 17, further comprising:
fourth interface circuitry configured to receive retention time data indicating a target retention time, wherein the processing circuitry is configured to set the retention time to the target retention time.

19. A method for privacy preservation, the method comprising:
- reading, from a sensor, event data indicating an event detected by the sensor and identification data indicating a first Identifier, ID, wherein the first ID is generated by the sensor to uniquely identify a specific user involved in the event;
- generating a data stream comprising the event data and the identification data;
- generating an updated data stream based on the data stream by updating the first ID to a second ID that is an intermediate ID (IID) in the identification data using a deterministic update function that is a hashing function or an encryption function that remains secret to avoid brute force inversion, and by adding noise to the event data to randomize the event data for privacy preservation, wherein the noise is calibrated based on a privacy budget;
- determining whether sufficient privacy budget is left for the updated data stream by determining whether publishing the updated data stream would exceed a privacy budget quantity that defines how much privacy is lost;
- adding cryptographic nonce to the updated data stream prior to encrypting the updated data stream; and
- in a case that it is determined that sufficient privacy budget is left for the updated data stream, generating encrypted data by encrypting the updated data stream; and
- outputting the encrypted data for transmission to an external data aggregator.

* * * * *